United States Patent
Abe et al.

(10) Patent No.: US 8,810,238 B2
(45) Date of Patent: Aug. 19, 2014

(54) MAGNETIC ENCODER

(75) Inventors: Yasunori Abe, Tokyo (JP); Masakazu Sugimoto, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 136 days.

(21) Appl. No.: 13/581,576

(22) PCT Filed: May 16, 2011

(86) PCT No.: PCT/JP2011/061201
§ 371 (c)(1),
(2), (4) Date: Aug. 28, 2012

(87) PCT Pub. No.: WO2011/145563
PCT Pub. Date: Nov. 24, 2011

(65) Prior Publication Data
US 2012/0326708 A1    Dec. 27, 2012

(30) Foreign Application Priority Data
May 17, 2010   (JP) .................................. 2010-113351

(51) Int. Cl.
| | |
|---|---|
| *G01R 33/09* | (2006.01) |
| *G01B 7/30* | (2006.01) |
| *G01D 5/14* | (2006.01) |
| *G01D 5/245* | (2006.01) |
| *G03B 17/00* | (2006.01) |

(52) U.S. Cl.
CPC ............. *G01D 5/145* (2013.01); *G01D 5/2451* (2013.01)
USPC ................... 324/207.21; 324/207.25; 396/87

(58) Field of Classification Search
USPC .................................................. 324/207.21
See application file for complete search history.

(56) References Cited

U.S. PATENT DOCUMENTS

| | | | |
|---|---|---|---|
| 4,399,476 | A | 8/1983 | King |
| 2005/0008359 | A1 | 1/2005 | Okazaki |
| 2006/0254375 | A1 | 11/2006 | Shoji |
| 2010/0141242 | A1 | 6/2010 | Abe et al. |

FOREIGN PATENT DOCUMENTS

| | | |
|---|---|---|
| JP | A-2000-205808 | 7/2000 |
| JP | A-2003-139567 | 5/2003 |
| JP | A-2003-240603 | 8/2003 |
| JP | A-2003-344105 | 12/2003 |

(Continued)

OTHER PUBLICATIONS

Aug. 9, 2011 International Search Report issued in International Application No. PCT/JP2011/061201 (with translation).

(Continued)

*Primary Examiner* — Bot Ledynh
(74) *Attorney, Agent, or Firm* — Oliff PLC

(57) ABSTRACT

To provide a magnetic encoder that is stable relative to an outside force and has only small variation of a gap between a magnetic sensor and a magnetic medium. The magnetic encoder includes a magnetic medium placed on a first member and a magnetic sensor placed on the second member, the first and second member for moving relative to each other. The magnetic sensor includes a sensor substrate, a sensor holding plate for holding the sensor substrate, and a wire for extracting a signal from the magneto-resistive element to outside. The sensor holding plate includes a fixing portion for fixing the sensor holding plate to the second member, a sensor holding member for holding the sensor substrate, and a plurality of arm portions provided in the relative movement direction with the sensor holding member in-between and extending from the fixing portion to constitute a cantilever.

4 Claims, 19 Drawing Sheets

(56) References Cited

FOREIGN PATENT DOCUMENTS

| JP | A-2006-047238 | 2/2006 |
| JP | A-2006-64381 | 3/2006 |
| JP | A-2006-317255 | 11/2006 |
| JP | A-2008-032517 | 2/2008 |
| WO | WO 2008/117596 A1 | 10/2008 |

OTHER PUBLICATIONS

Feb. 18, 2014 Extended European Search Report issued in European Patent Application No. 11783497.8.

MAGNETIC ENCODER

TECHNICAL FIELD

The present invention relates to a magnetic encoder for detecting a strength of magnetic field emanating from a magnetic medium, using a magnetic sensor, to obtain a displacement or a speed of a movable member.

BACKGROUND ART

There are many devices for precisely determining a displacement and a speed of a movable member for feed-back control. One example of such a device includes a lens barrel of an autofocus camera. In the lens barrel, a focusing mechanism for advancing and retreating a focus lens, using an electric motor or a supersonic motor, is provided. In order to determine a rotation displacement of a rotating barrel constituting the focusing mechanism, a magnetic encoder is used. Patent Document 1 discloses a magnetic encoder used in such a focusing mechanism, of which outside perspective view is shown in FIG. 17. According to the technique disclosed in Patent Document 1, a magnetic sensor 405" is pressed onto a magnetic medium 415 having a curvature provided along the lens barrel 410. The magnetic sensor 405" includes a magnetic sensor element 401 and a pressure spring 402. As seen from FIG. 17, the thickness of the magnetic sensor 405" is very small, compared to the size of a part thereof opposite to a magnetic medium. As a thin magnetic sensor is required in the limited space in the barrel, a magnetic encoder is more often used than an optical encoder, which cannot be readily formed thin. With this focusing mechanism, an output from the magnetic sensor element 401 is fed back to drive the motor 411 to focus.

For highly accurate determination of a displacement, high resolution is required to a magnetic encoder. Resolution can be expressed by a magnetizing pitch of a magnetic medium. Although a conventional magnetizing pitch is of 30 to 50 μm, a magnetizing pitch of 10 to 20 μm, or even 10 μm or smaller, is recently required. However, with a tendency of higher resolution, the interval, or a gap, between the magnetic medium and the magnetic sensor element comes to be more influential. In view of the above, gap variation needs to be prevented. For this purpose, a method for sliding the magnetic medium and the magnetic sensor element placed in contact with each other is advantageous and often employed.

In the following, for readily understandable explanation of a positional relationship between a magnetic sensor and a magnetic medium, a relative movement direction of the magnetic medium and the magnetic sensor is defined as the X axis. In the case of a magnetic medium having a curved surface, the tangent direction of the magnetic medium at a point where the magnetic sensor contacts the magnetic medium is defined as the X axis.

Further, one of the directions perpendicular to the X axis, a direction intersecting the curvature center of the magnetic medium (a radius vector direction) is defined as the Z axis, and the other as the Y axis. Still further, when a point where the magnetic sensor is pressed onto the magnetic medium (a pressure point) is located on the Z axis, the point is defined as the origin of the X axis, and a displacement in the X direction from the X axis origin is defined as an X offset. Yet further, for more understandable explanation of a relative posture of the sliding surface of the magnetic sensor and the magnetic medium, an angle at which the sliding surface rotates around the X axis being as a rotation axis is referred to as a pitch angle. Still further, an angle at which the sliding surface rotates around the Y axis being as a rotation axis is referred to a roll angle. The roll angle with the sliding surface in parallel to the X axis is defined as 0 degrees. The pitch angle with the sliding surface in parallel to the Y axis is defined as 0 degree.

FIG. 18 shows a structure of the pressure spring 402. The pressure spring 402 urges the magnetic sensor element 401 substantially uniformly onto the magnetic medium 415 in assembling to thereby keep the pitch angle of the magnetic sensor stable in sliding. The magnetic sensor element 401 is attached to a holder 406, and the holder 406 can rock relative to the pressure spring 402 with a rocking central axis defined on the back surface of the holder 406 as a fulcrum. With the above, even though the distance between the fixing portion of the pressure spring 402 and the magnetic medium should vary, the magnetic sensor element 401 can be kept closely attached to the magnetic medium 415 via a spacer 407 as the holder rocks relative to the pressure spring 402. As the magnetic sensor element rocks with the rocking central axis in substantially parallel to the displacement direction of the magnetic medium as a fulcrum, the magnetic sensor element remains closely attached to the magnetic medium via a spacer or the like in-between, and the amount of movement of the magnetic medium (that is, the amount of advancement and retreatment of the focus lens) can be determined with high accuracy. The rocking center functions as a fulcrum for rocking, constituting a pressure point 408 at which the magnetic sensor element 401 is pressed onto the magnetic medium 415. An output of the magnetic sensor element 401 is extracted using an FPC (Flexible Print Circuit) 412.

Patent Document 2 describes a structure in which one leaf spring bears a pressure function and a function for keeping a constant pitch angle. As shown in FIG. 19, the leaf spring 531 holds a magnetic sensor element 501 by a sensor holding portion 524, and supports the sensor holding portion 524 by a first arm portion 555, a connection portion 556, and a second arm portion 557, and a fixing portion 526 is fixed to a mount pedestal 523. An output from the magnetic sensor element 501 is extracted using an FPC 512. As shown in FIG. 20, even though the distance between the fixing portion 526 of the leaf spring 531 and the magnetic medium 515 should vary, the first arm portion 555 and the second arm portion 557 flex in the opposite directions from each other, whereby the pitch angle can be kept constant. However, with a request for further accuracy, gap variation due to an X offset of the magnetic medium 515 and the magnetic sensor element 501 and the roll angle comes to be a larger problem to be solved.

Patent Document 3 discloses a method for reducing gap variation due to an X offset of the magnetic sensor element 601 and the roll angle. As shown in FIG. 21, the magnetic sensor element 601 of which width w in the slide direction is very narrow, that is, twice to fifteen times the magnetizing pitch (0.04 to 0.3 mm), is proposed. According to this technique disclosed in Patent Document 3, by defining small, that is, 0.3 mm or smaller, the width in the slide direction of the magnetic sensor element 601 that contacts the magnetic medium 615, gap variation due to an x offset and the roll angle variation is reduced, whereby the signal output amplitude is stabilized.

Patent Document 4 discloses leaf spring members having spring arm portions for connecting a fixing portion and a fixedly attached sensor portion to each other, extending in the respective returned directions, a sensor support mechanism using the same, and a rotary encoder.

Patent Document 5 discloses a magnetic encoder having a magnetic sensor holding mechanism for connecting two sides of a fixing portion and four sides of a sensor holding portion by four elastic arm portions, as shown in FIG. 22.

RELATED ART DOCUMENT

Patent Document

Patent Document 1: Japanese Patent Laid-open Publication No. 2000-205808
Patent Document 2: Japanese Patent Laid-open Publication No. 2003-344105
Patent Document 3: Japanese Patent Laid-open Publication No. 2006-64381
Patent Document 4: Japanese Patent Laid-open Publication No. 2006-317255
Patent Document 5: International Publication 2008/117596

DISCLOSURE OF INVENTION

Problem to be Solved by the Invention

Formation of the width in the slide direction as small as 0.3 mm or smaller, as described in Patent Document 3, shown in FIG. 21, can prevent gap variation despite an X offset and roll angle variation. However, such a magnetic encoder has a problem described below when being package. That is, because the width w in the sliding direction is small, it is highly likely that edges 614 of the both respective ends in the slide direction of the magnetic sensor element 601 touch a magnetic medium 615. This requires formation of a curved surface on the edge 614. A conventional magnetic sensor element is obtained by forming an element on a wafer and then cutting the wafer, using a grinder. However, formation of a curved surface on an edge needs to be done with the magnetic sensor element left alone. This makes it difficult to reduce manufacturing cost.

Although Patent Document 3, shown in FIG. 21, does not mention a specific numeric value as to the thickness h' of the magnetic sensor element 601, the FPC 612 is formed around the magnetic sensor element 601, and the thickness h' of the magnetic sensor element 601 needs to be thicker than the thickness of the FPC 612. Specifically, as the FPC 612 is at least 0.5 mm thick, the thickness h' of the magnetic sensor element 601 also is at least 0.5 mm. That is, the thickness h' of the magnetic sensor element 601 is at least a few times the width w in the slide direction.

However, it is difficult to fix an element having a thickness h' thicker than the width w thereof to a suspension 613 so as to be perpendicular to the suspension 613. Moreover, it is also difficult to fix such that a pressure point is positioned on the central portion in the width w in the slide direction of the magnetic sensor element 601. As the magnetic sensor element receives a force so as to be pulled in the moving direction of the magnetic medium with the pressure point as a fulcrum, the magnetic sensor element tends to be readily inclined when the pressure point is displaced from the central portion of the magnetic sensor element. This increases the frequency for the edge 614 of an end of the sensor element to touch the magnetic medium 615, and thus deteriorates abrasion resistance. Further, as the slide area is defined small, when the magnetic sensor is pressed onto the magnetic medium with a load having a conventional value, an excessively large pressing force per unit area is resulted, and abrasion resistance is thus deteriorated. To address the above, the load needs to be made smaller. However, when the load is made smaller, the magnetic sensor element 601 may tend to be readily inclined upon application of an outside force, such as an impulse or the like, to the magnetic encoder.

According to a structure disclosed in Patent Document 4, it is described that a fixedly attached sensor portion moves up and down while being kept in parallel to the fixing portion, so that gap variation of the detection unit of the sensor is reduced. Moreover, according to Patent Document 4, spring arm portions being bent beforehand in the Z axial direction to be no longer a flat panel are used. As the spring arm portion is long, a line that connects the respective ends of the first spring arm portions being bent and extending from the fixing portion makes an axial line, and the fixedly attached sensor portion rotates in the pitch direction. This may cause a problem of gap variation, similar to the technique disclosed in Patent Document 2. Still further, presence of a thin long portion extending while being repetitively folded back and forth may possibly cause inclination in the roll direction.

According to a structure described in Patent Document 5, as two fixing portions are used so that the leaf spring has a double end supported beam structure, influence of an outside impulse is prevented. However, presence of two fixing portions for supporting the double-end supported beam makes difficult further size reduction of the sensor holding plate.

One of the objects of the present invention is to provide a magnetic encoder having a smaller sensor holding plate in the size, and being stable relative to an outside force, such as an impulse or the like, applied thereto and capable of preventing variation of a gap between the magnetic sensor element and the magnetic medium.

Solution to the Problem

A magnetic encoder according to the present invention comprises a magnetic medium placed on a first member and a magnetic sensor placed on a second member, the first member and the second member for moving relative to each other. The magnetic sensor includes a sensor substrate having a magneto-resistive element mounted thereon for detecting a magnetic field emanating from the magnetic medium, for reciprocatively sliding relative to the magnetic medium; a sensor holding plate for holding the sensor substrate; and a wire for extracting a signal from the magneto-resistive element to outside. The sensor holding plate includes a fixing portion for fixing the sensor holding plate to the second member; a sensor holding member for holding the sensor substrate; and a plurality of arm portions provided in the direction of relative movement, with the sensor holding member in-between, and extending from the fixing portion so as to each constitute a cantilever. The arm portion has a portion of which width becomes larger either continuously or stepwisely from a side of the sensor holding member toward the fixing portion.

Advantageous Effect of the Invention

According to the present invention, there can be obtained a magnetic encoder having a smaller sensor holding plate and being stable relative to an outside force such as an impulse, in which variation of the gap between the magnetic sensor element and the magnetic medium is small.

DESCRIPTION OF THE EMBODIMENT

Figure 1:
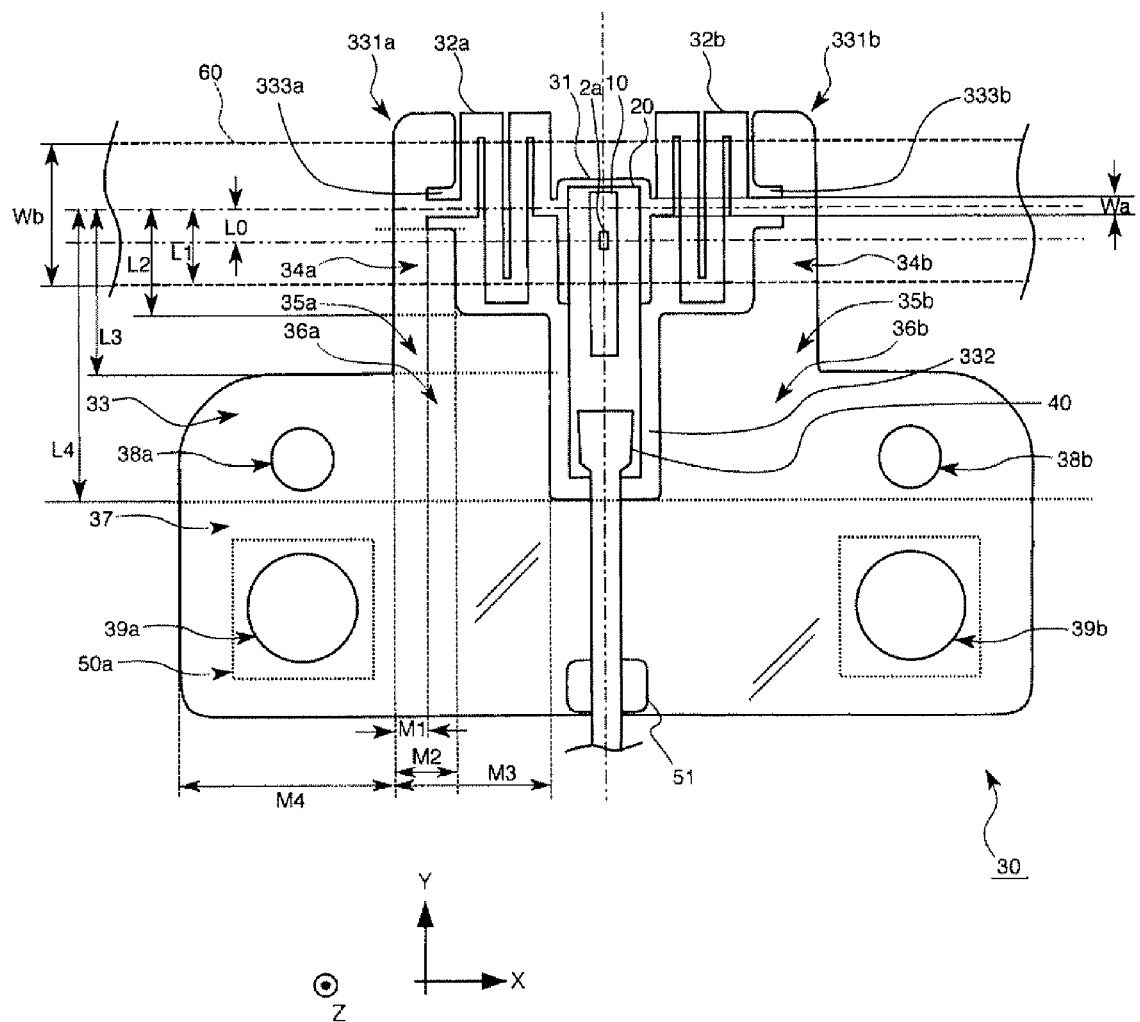
FIG. 1 schematically shows a magnetic encoder according to an embodiment of the present invention.

In the following, embodiments will be described in detail referring to the drawings. The present invention is not limited to the embodiments described below. To help understanding, identical components or parts are given an identical reference numeral. Parts that make a pair are given an alphabet, such as a or b, attached after the reference numeral to indicate if the part is on the left or right side. For example, as to reference numeral 50, 50a and 50b are used.

(First Aspect of Embodiment)

FIG. 1 schematically shows a magnetic encoder according to an aspect of an embodiment of the present invention. As shown in FIG. 1, a magnetic encoder according to this embodiment has a magnetic sheet 60 that is a magnetic medium, a sensor substrate 10 where a GMR (Giant Magneto Resistive Effect) element 2a that is a magnetic sensor element is placed, a glass epoxy wire substrate 20, and a sensor holding plate 30, and is fixed to a mount pedestal 50. FIG. 1 shows the magnetic encoder according to this embodiment viewed from the side of the magnetic sheet 60 (indicated by the broken line in the diagram) so as to penetrate the magnetic sheet 60. The mount pedestal 50, hidden behind the back surface of the sensor holding plate 30, is indicated by the chain line. The mount pedestal 50 corresponds to a part of a camera lens barrel in the case where, for example, the magnetic encoder according to this embodiment is used to attain an autofocus function of a camera.

Figure 2:
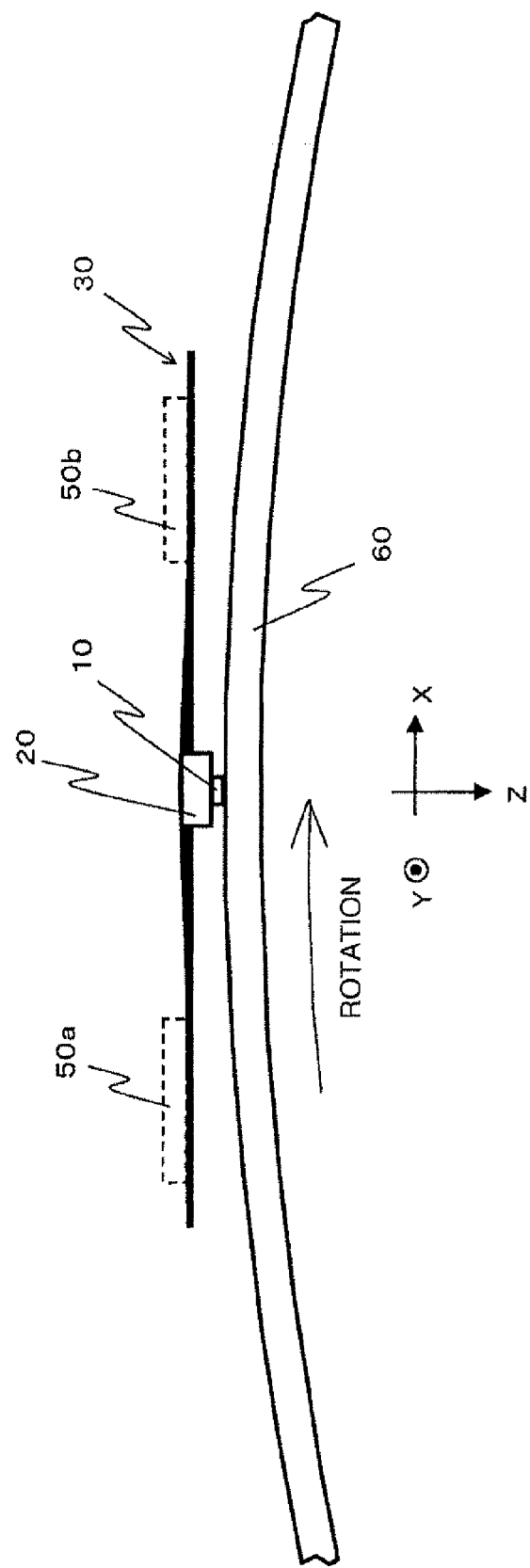
FIG. 2 is a side view of a magnetic encoder according to the embodiment of the present invention.
Figure 3:
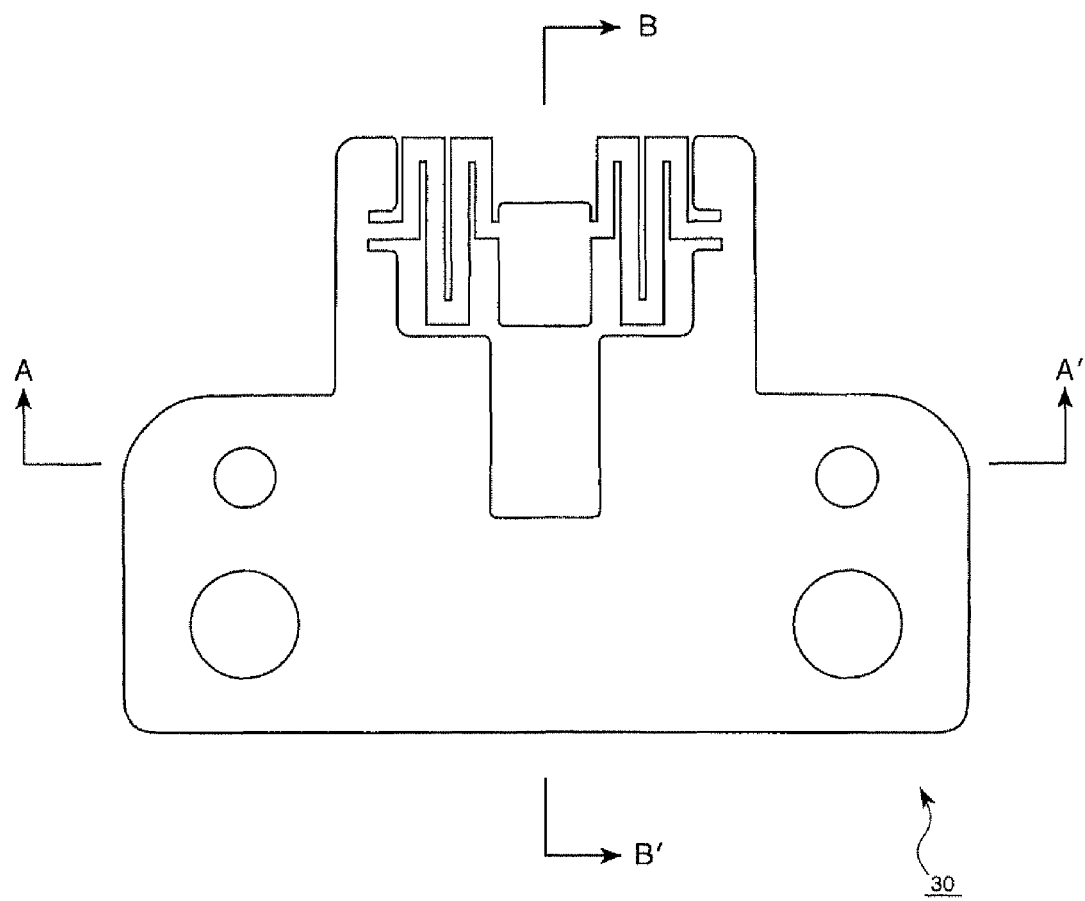
FIG. 3 is a plan view of a sensor holding plate used in the magnetic encoder according to the embodiment of the present invention.
Figure 4:
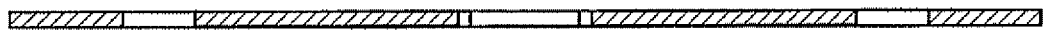
FIG. 4 is a cross sectional view of the sensor holding plate according to the embodiment of the present invention.
Figure 5:
FIG. 5 is another cross sectional view of the sensor holding plate according to the embodiment of the present invention.
Figure 6:
FIG. 6 is a front view of the sensor holding plate according to the embodiment of the present invention.
Figure 7:
FIG. 7 is a rear view of the sensor holding plate according to the embodiment of the present invention.
Figure 8:
FIG. 8 is a left side view of the sensor holding plate according to the embodiment of the present invention.
Figure 9:
FIG. 9 is a right side view of the sensor holding plate according to the embodiment of the present invention.
Figure 10:
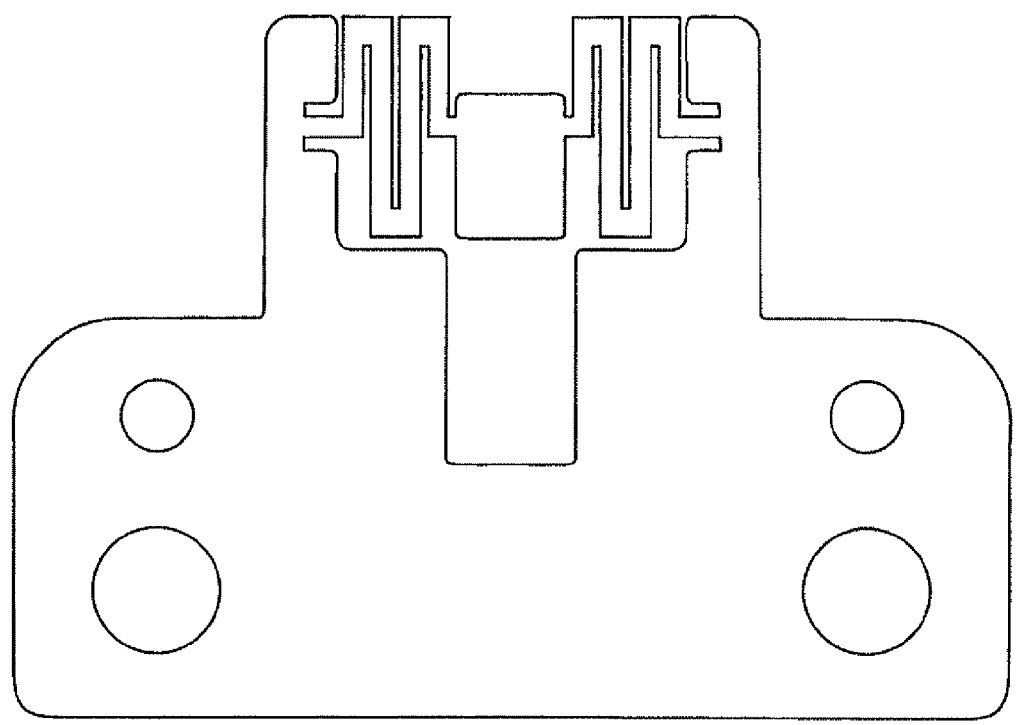
FIG. 10 is a bottom view of the sensor holding plate according to the embodiment of the present invention.
Figure 10:
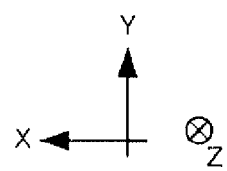

FIG. 2 is a side view of the magnetic encoder shown in FIG. 1, viewed in the negative direction of the Y axis from the side of the magnetic sheet 60 that is a magnetic medium. In FIG. 2, the sensor substrate 10 is pressed onto the magnetic sheet 60 that is a magnetic medium to thereby bend an elastically deformable portion 32. FIG. 3 is a plan view of the sensor holding plate 30 shown in FIG. 1. FIG. 4 is a cross section along the line A-A' in FIG. 3. FIG. 5 is a cross section along the line B-B' in FIG. 3. FIGS. 6, 7, 8, 9, and 10 are front view, rear view, left side view, right side view, and bottom view of the sensor holding plate 30.

Note that, here as well, the relative movement direction of the magnetic medium and the magnetic sensor is defined as the X axis. For a magnetic medium having a curved surface, the tangent direction of the magnetic medium at a point where the magnetic sensor touches the magnetic medium is defined as the X axis. One of the directions perpendicular to the X axis, the direction (radius vector direction) intersecting the curvature center of the magnetic medium is defined as the Z axis, and the other as the Y axis.

The sensor holding plate 30 further includes a sensor holding portion 31, the elastically deformable portion 32, a support portion 33, and a fixing portion 37. The fixing portion 37 is positioned not overlapping the magnetic medium, and fixed to the mount pedestal 50.

The sensor holding plate 30 shown in FIG. 1 is fixed by a screw to the mount pedestals 50a, 50b while utilizing holes 39a, 39b formed on the fixing portion 37. By fixing the sensor holding plate 30 to the mount pedestal 50, the sensor substrate 10 is pressed onto the magnetic sheet 60 at a predetermined position with a predetermined load. The sensor holding portion 31 of the sensor holding plate 30, two elastically deformable portions 32, the support portion 33, and the fixing portion 37 may be made integral by machining one sheet of thin metal plate. With the above, the sensor holding plate 30 can be formed thinner as an integral leaf spring, compared to a case in which the elastically deformable portion 32 and the support portion 33 are made using separate rigid members and assembled together or when a pivot is used besides the sensor holding plate 30. Note that the elastically deformable portion 32 and the support portion 33 will be hereinafter referred to as an elastic arm portion.

The sensor holding plate 30 formed as an integral leaf spring reduces variation in an attitude angle of the sensor substrate, and contributes to reduction of the number of parts and assembly cost. The sensor holding plate 30 may be used in the form of a flat panel when used in a magnetic encoder.

The sensor holding portion 31 holds a glass epoxy wire substrate 20. The support portion 33 has a plurality of arm portions 331a, 331b and also a cut-out 332. Specifically, at least arm portions 331 that make a pair are provided apart from each other in the relative movement direction of the magnetic medium, that is, the X axial direction (width direction), with a position where the magnetic sensor is to be placed in-between. The arm portion 331 is connected to the fixing portion 37 and formed so as to become wider either continuously or stepwisely as it goes toward the fixing portion 37.

In this embodiment, each arm portion 331 has a crossover section 34 that intersects a magnetic medium. Specifically, the crossover section 34 corresponds to an area in the arm portion 331, between the side of an end opposite from the fixing portion 37 and the position, which is at the distance L2 from the central axis of rotation in the pitch angle direction of the elastically deformable portion 32 (indicated by the one dot chain line in parallel to the X axis, and hereinafter referred to as a pitch rotation central axis of the elastically deformable portion 32) toward the fixing portion 37. The arm portion 331 of the support portion 33 includes a thick width portion 35 larger in the width direction than the crossover section 34 (an area from the distance L2 to the distance L3 from the side of the pitch rotation central axis of the elastically deformable portion 32 (indicated by the one dot chain line in parallel to the X axis) toward the fixing portion 37) and a wide width portion 36 formed so as to become continuously wider than the thick width portion 35 (an area from the distance L3 to the distance L4 from the side of the pitch rotation central axis of the elastically deformable portion 32 (indicated by the one dot chain line in parallel to the X axis) toward the fixing portion 37). FIG. 1 shows an example in which the width of the wide width portion 36 is substantially the same as that of the fixing portion 37 in an area where the wide width portion 36 is connected to the fixing portion 37.

The cut-out 332 is formed at the substantially central portion in the width direction in the support portion 33, being concave toward the fixing portion 37. The cut-out 332 is wider than the glass epoxy wire substrate 20. The respective crossover sections 34a, 34b of the arm portions 331a, 331b are connected on the both respective sides of the sensor holding portion 31 for holding a magnetic sensor via the respective elastically deformable portions 32a, 32b. In FIG. 1, the elastically deformable portion 32 is made by repetitively folding back and forth a relatively slim member. Note that the sensor holding portion 31 and the elastically deformable portion 32 are referred to as a sensor holding member.

That is, in this embodiment, the arm portion 331 includes a part that extends from a position with the distance L0 toward the fixing portion 37 so as to become wider either stepwisely or continuously, in which the position with the distance L0 corresponds to the distance between the pitch rotation central axis of the elastically deformable portion 32 and the center of the GMR element 2a, or a magnetic sensor element. When the support portion 33 is formed so as to become wider as it goes toward the root thereof, as described above, an improved rigidity can be ensured so that the sensor substrate 10 can be prevented from being inclined in the roll direction. Moreover, with the improved rigidity, the sensor holding plate 30 can be used thin and pivot-less even when being used in the form of a flat leaf spring. The one dot chain line in parallel to the Y axial direction corresponds to a center line that connects the center in the width direction of the sensor holding portion 31 and that of the fixing portion 37. FIG. 1 shows an example in which the elastically deformable portions 32 are formed symmetrical relative to the center line.

The elastically deformable portion 32 extends in the width direction of the sensor holding portion 31 while being repeatedly folded back and forth. The rotation axis in the pitch direction of the elastically deformable portion 32 is indicated by the one dot chain line. That is, the elastically deformable portions 32a, 32b are attached on the both respective sides of the sensor holding portion 31 such that the one dot chain line corresponds to the rotation axis in the pitch direction of the sensor holding portion 31. Meanwhile, the respective other ends of the elastically deformable portions 32 are supported by the support portions 33 that function as a cantilever. The support portion is attached to the fixing portion 37.

The elastically deformable portion 32 constitutes a part for exerting a spring load when the sensor substrate is pressed onto the magnetic sheet to stabilize sliding of the magnetic sheet and the sensor substrate. Further, the elastically deformable portion 32 can prevent expansion of an air gap relative to pitch angle variation as pitch rigidity can be reduced.

The sensor substrate 10 is fixed to the glass epoxy wire substrate 20. The glass epoxy wire substrate 20 has a rectangular shape that is long in the Y axial direction, and is fixed to the sensor holding portion 31 at one end thereof, with the other end thereof being placed in the cut-out 332 of the support portion 33 or placed not in contact with the support portion 33. Wires of the same number as that of the terminals of the GMR element 2a placed on the sensor substrate 10 are formed on the glass epoxy wire substrate 20.

The center of the GMR element 2a on the sensor substrate 10 (a cross point where the one dot chain line indicative of the center line and in parallel to the Y axis intersects the two dot chain line in parallel to the X axis) is positioned closer to the edge 60a of the magnetic sheet on the side of the support portion 33 than the rotation axis in the pitch direction of the elastically deformable portion 32 (the pitch rotation central axis of the elastically deformable portion 32, indicated by the one dot chain line in parallel to the X axis). This positioning can prevent influence of pitch angle variation on the GMR element 2a and deformation of the support portion 33 when the sensor substrate is pressed onto the magnetic sheet.

In the crossover section 34 of the arm portion 331, slits 333 are formed on the both respective sides of a part connected to the elastically deformable portion 32 so as to extend in the X axial direction. The width M1 of the crossover section 34 in the area where the slit 333 is formed is smaller than the width M2 of the remaining area in the crossover section 34. Formation of the slit 333 can prevent concentration of a stress onto a part where the elastically deformable portion 32 is connected to the crossover section 34 even when an outside force, such as an impulse or the like, is applied. Stress concentration should be avoided as application of a stress in excess of a yield stress of the material may make the material unrestorable from deformation.

In this embodiment, as the majority of the crossover section 34 has a wider width, namely, M2, improved rigidity can be ensured, compared to a case in which the support portion is formed extending having the width M1 unchanged. Here, the width M3 of the thick width portion 35 is determined as follows. That is, the cut-out 332 is formed in the thick width portion 35 in order to prevent the wire substrate 20 from interfering the thick width portion 35 when the wire substrate 20 should be inclined due to an outside force, such as an impulse or the like, applied thereto. Therefore, although the thick width portion 35 is formed so as to become wider as it goes toward the center line than the crossover section 34 of the arm portion 331, the cut-out 332 is formed having such a width that can prevent the wire substrate 20 from contacting the thick width portion 35 even when the wire substrate 20 should be inclined due to an outside force. The width M3 of the thick width portion 35 is determined as described above. This can improve the rigidity of the support portion 33.

The wide width portion 36 is formed such that the width thereof becomes even wider than the thick width portion 35 as it goes toward outside by an amount M4 (that is, the width M3+M4 is resulted at the end of the cut-out 332 and in the fixing portion 37). This contributes to improvement of rigidity. A hole 38 may be formed in the wide width portion 36 to be used for temporal attachment of the sensor holding plate.

When the supporting portion 33 is formed so as to become wider as a whole as it goes toward the root thereof, as described above, rigidity is improved and the sensor substrate 10 is prevented from being inclined in the roll direction. With the improved rigidity, the sensor holding plate 30 can be used thin and pivot-less even in a flat leaf spring form. The one dot chain line in parallel to the Y axial direction corresponds to the center line that connects the center of the sensor holding portion 31 and that of the fixing portion 37. Note here that the arm portions 331 are formed symmetrical to each other relative to the center line.

In FIG. 1, an electrode pad is provided near an end of the sensor substrate 10 shown lower in the diagram (in the negative direction of the Y axis) and made electrically conductive via a wire with the glass epoxy wire substrate 20, or a wire substrate. The glass epoxy wire substrate 20 is made electrically conductive with the FPC 40 via a lead-free solder (not shown in the diagram). The FPC 40 may be fixed to an end portion of the fixing portion 37 (an end portion in the negative direction of the Y axis), using resin 51 or the like. That is, an electric signal from the GMR element 2a is extracted to outside via the wire on the glass epoxy wire substrate 20 and the FPC 40. The FPC 40 is less wide between a portion thereof in contact with the wire on the glass epoxy wire substrate 20 and a portion thereof fixed by resin 51 than the portion thereof in contact with the wire on the glass epoxy wire substrate 20. The FPC 40 is formed slim as described above in order not to hinder an action of the sensor holding plate in the pitch direction, as use of a wider FPC may hinder an action of the elastically deformable portion 32 for urging the sensor holding plate 31 onto the magnetic sheet so as to have them opposite to each other in parallel.

In FIG. 1, L0 indicates the distance between the rotation axis in the pitch direction of the elastically deformable portion 32 and the center of the GMR element 2a, and corresponds to the interval between the one dot chain line and the two dot chain line extending in the X direction. L1 indicates the distance from the rotation axis in the pitch direction of the elastically deformable portion 32 (the one dot chain line in the direction along the x axis) to the edge 60a of the magnetic sheet (the edge on the side of the fixing portion 37). L2 corresponds to the distance from the rotation axis in the pitch direction of the elastically deformable portion 32 (the one dot chain line in the direction along the X axis) to the boundary between the crossover section 34 of the arm portion 331 and the thick width portion 35. L3 corresponds to the distance from the rotation axis in the pitch direction of the elastically deformable portion 32 (the one dot chain line in the direction along the X axis) to the boundary between the thick width portion 35 and the wide width portion 36. L4 corresponds to the distance from the rotation axis in the pitch direction of the elastically deformable portion 32 (the one dot chain line in the direction along the X axis) to the boundary between the wide width portion 36 and the fixing portion 37. Note that although the respective boundaries of the crossover section 34, the thick width portion 35, and the wide width portion 36 are indicated by broken lines in FIG. 1, as the sensor holding portion 31, the two elastically deformable portions 32, the support portion 33, and the fixing portion 37 may be integrally formed by machining one sheet of thin metal panel, as described above, the broken lines are only for an explanation purpose.

The width of the elastically deformable portion 32 is defined as Wa, and the elastically deformable portion 32 connects the sensor holding portion 31 and the support portion 33. When the length of the elastically deformable portion 32 is defined as La11, preferably, $$(M2/L4) > (Wa/La11)$$

is satisfied.

When Wa is made smaller, the rigidity of the elastically deformable portion 32 is reduced so that the support portion 33 does not hinder the sensor holding portion 31 from being opposed in parallel to the magnetic medium in the pitch direction. Moreover, the support portion 33 is formed so as to become wider on the side closer to the fixing portion 37. In this manner, "separation of the functions of the elastically deformable portion 32 and the support portion 33" to be described later can be attained.

Preferably, the distance L1 between the end of the magnetic medium on the side of the fixing portion 37 and the pitch rotation central axis of the elastically deformable portion 32 satisfies the relationship $Wb/3 <= L1 <= 2Wb/3$ relative to the width Wb of the magnetic medium. When the distance L1 is larger than 2Wb/3, the sensor holding portion 31 projects more in the positive direction of the Y axis than the magnetic medium, resulting in an excessively large sensor holding portion 31. This is not preferable in view of size reduction. Meanwhile, when the distance L1 is smaller than Wb/3, the relationship expressed by the expression (1) mentioned below cannot be satisfied, and a force for separating the magnetic medium and the sensor substrate 10 from each other is unpreferably applied.

When the distance between the rotation axis in the pitch direction of the elastically deformable portion 32 and the center in the Y axial direction of the GMR element 2a on the sensor substrate 10 is defined as L0, preferably, L0 is defined larger than "0". L1 corresponds to the distance from the pitch rotation central axis of the elastically deformable portion 32 to the end of the magnetic medium on the side of the fixing portion 37. As the sensor substrate 10 touches the edge of the magnetic medium on the side of the fixing portion 37 and the sensor substrate 10 itself is slightly inclined, an air gap is caused at the position of the pitch rotation central axis. Preferably, the pitch rotation central axis is positioned on the opposite side from the fixing portion 37 relative to the line (the center line of Wa) that connects the roots of the portions having the width Wa of the elastically deformable portions 32.

Further, in order to prevent generation of an air gap between the magnetic medium and the sensor substrate 10 having the GMR element 2a mounted thereon and to slide the sensor substrate 10 relative to the magnetic medium, preferably, Li is defined so as to satisfy the expression (1) in the structure according to this embodiment.

$$F \cdot L1 > kp \cdot \theta \qquad (1)$$

wherein F is a load to be applied at the position of the pitch rotation central axis of the sensor holding portion and can be obtained as a product of a spring constant k of the sensor holding portion 31 at the position of the pitch rotation central axis of the sensor holding portion 31 and a press height t. That is, $F = k \cdot t$ is held. At the position of the pitch rotation central axis of the sensor holding portion 31, t corresponds to the air gap between the sensor substrate 10 and the magnetic medium in the initial state. The product of F and L1, namely, F·L1, represents a moment. Kp corresponds to the pitch rigidity of the sensor holding plate, and θ corresponds to the pitch angle in the initial state. Note that the initial state corresponds to a state at the beginning in which the sensor holding plate is fixed to the mount portion and the sensor substrate is pressing the magnetic sheet.

That is, it is desirable that the magnetic encoder according to this embodiment is formed under a condition in which the product of kp and θ is smaller than the product of F and L1. The pitch rigidity is a strength necessary to ensure a pitch angle 1° (unit: gf·mm/°). As a method for measurement, 1 gf is applied at a position in the sensor holding portion 31 away by 1 mm from the position of the pitch rotation central axis (a position away in the Y axis), and a displacement at the load position (height displacement: displacement in the Z direction) is then measured using a displacement measurer to calculate a pitch angle θ. In the sensor holding portion 31 in this embodiment, kp (gf·mm/°) is defined in the order of 0.4 to 0.9 (gf·mm/°), and more preferably, between 0.4 and 0.6 inclusive, wherein 1 gf corresponds to 10 mN.

As the elastically deformable portion 32, a back-and-forth folded type, a back-and-forth folded curved type, that is, a back-and-forth folded type modified into a curved shape, a rectangular ring type, a circular or oval ring type, and so forth, may be used. For a ring type, a shape including two or more rings connected to each other can be used. The length Lall of the beam of the elastically deformable portion corresponds to, in the case of a back-and-forth folded type, the length along the center of the folded path. In the case of a ring type, Lall is obtained with the length of a branched path included. Wa corresponds to the width of the path. In the case where the width is changed partway, an average obtained by dividing an integrated value of the width over the entire length by the entire length may be defined as Wa.

Between the sensor holding portion 31 and the fixing portion 37, the cut-out 332 is formed in the form of a concave in the support portion 33 as a space for avoiding contact between the elastic arm portion and the glass epoxy wire substrate 20, or a wire substrate. With the space, the elastic arm portion can be prevented from touching the wire substrate even though the elastic arm portion is flexed due to an outside force, such as an impulse, applied thereto.

Preferably, the sensor holding portion 31 has elasticity relative to rotation around a rotation axis extending in the direction in which the GMR element 2a or the like, or a magnetic sensor, slides relative to the magnetic medium, elasticity relative to rotation around a rotation axis extending in a direction perpendicular to the slide direction and in parallel to the surface of the magnetic medium, and elasticity relative to a direction perpendicular to the plane of the sensor holding Portion 31.

The sensor holding portion 31 is connected via a pair of elastic arm portions to one fixing portion 37, and the fixing portion 37 is fixed to the mount pedestal, whereby the sensor holding portion 31 is supported by the mount pedestal via the elastic arm portions and the fixing portion 37. The elastic arm portion includes the elastically deformable portion 32 and the support portion 33. The support portion 33 has a so-called cantilever (referred also as a cantilever spring) structure. The elastically deformable portion 32 functions such that the sensor holding portion 31 moves up and down in the Z axial direction while remaining in parallel to the fixing portion 37 even though the distance in the Z axial direction between a position near an end (the crossover section 34) of the support portion 33 and the magnetic medium should vary. With the above, it is possible to remarkably reduce variation in the gap between the magnetic sensor and the magnetic medium. The elastically deformable portion 32 is supported such that the width Wa thereof is smaller than the maximum width M1 of the crossover section 34 of the arm portion 331 of the support portion 33 and that the rotation axis in the pitch direction extends in the X axial direction. As the arm portion 331 of the support portion 33 is formed so as to become wider as it goes toward the fixing portion 37, improved rigidity can be ensured so that the sensor substrate 10 mounted on the sensor holding portion 31 can be prevented from being inclined in the roll direction. In this manner, the elastically deformable portion 32 and the support portion 33 bear the respective functions.

Further, according to the magnetic encoder in this embodiment, one fixing portion 37, the pair of elastic arm portions, and the sensor holding portion 31 are positioned on a substantially identical plane.

The sensor holding portion 31, the elastic arm portion, and the fixing portion 37, which constitute the sensor holding plate 30, are made of the same material so as to have the same thickness. The thickness is preferably between 50 μm and 200 μm inclusive. With the thickness of 50 μm or smaller, the rigidity of the sensor holding plate is insufficient, which makes difficult handling of the sensor holding plate 30. Meanwhile, with the thickness of 200 μm or larger, the rigidity of the sensor holding plate is large, which requires a larger force with which to press the sensor holding plate 30 onto the magnetic medium. This may deteriorate abrasive resistance.

The sensor holding portion 31, elastic arm portion, and fixing portion 37 of the sensor holding plate 30 are formed integral. Specifically, the entire plane shape of the sensor holding plate 30 can be made by etching or punch press machining of one sheet of metal plate. Although a preferable thickness may differ depending on the metal material in use, a metal plate between 50 μm and 200 μm thick is preferably used in view of elasticity in the roll direction, the pitch direction, and the direction in which the sensor holding plate 30 is pressed onto the magnetic medium. The sensor holding plate 30 is not bent in the Z axial direction before being fixed to the mount pedestal 50, but used in a plane form.

In order not to disturb the magnetic field emanating from the magnetic medium, preferably, the sensor holding plate 30 is made of non-magnetic material. That is, a plate made of elastic non-magnetic metal adapted to chemical etching may be selected. In forming a complicated shape of the elastic arm portion through punch press machining, material adapted to chemical etching may be selected in consideration of cost for a press die and possible difficulty in shape modification. An example of a material bendable and readily adapted to chemical etching includes a non-magnetic stainless (Fe—Ni—Cr), phosphor bronze (Cu—Sn—P), nickel silver (Cu—Ni—Zn), brass (Cu—Zn), and the like. Copper alloy may be also usable. For example, nickel silver is a copper-based alloy referred to also as German silver.

In the magnetic encoder in this embodiment, preferably, a pressing load between 50 mN (5 gf) and 800 mN (82 gf) inclusive is applied to the magnetic medium in a direction perpendicular to the plane of the sensor holding portion 31. In the case of a load smaller than 50 mN, a force of a load with which the magnetic sensor element presses the magnetic medium is so small that the surface of the magnetic sensor element floats from the magnetic medium surface while sliding, which increases a possibility of causing variation in the output voltage. This is caused due to presence of a slight curve of the surface of the magnetic medium, jump of the arm portion, separation due to an outside force, and so forth. meanwhile, in the case of a load larger than 800 mN, although jump of the magnetic sensor element and separation due to an outside force can be prevented, a problem of abrasion resistance will be caused. For example, with a magnetic medium having magnetic material coated on a plastic film, excessive increase of a load causes deformation of the surface of the magnetic medium, and in the case of a magnetic sensor element having a small width, the magnetic material is chipped at an end (an edge) thereof in the slide direction of the magnetic sensor element. This sharply deteriorates abrasion resistance.

The value of a load that causes deformation of the surface of a magnetic medium can be obtained as follows. That is, a transparent glass plate is pressed onto the surface of a magnetic medium having a curvature radius 25 mm, and a load that makes a contact width 0.5 mm between the transparent glass and the magnetic medium is obtained. Suppose here that the surface of the magnetic medium is deformed when the contact width is 0.5 mm; the width of the magnetic medium is 3 mm; and the average roughness Ra of the surface of the magnetic medium is about 1 μm. Further, the plastic film of the magnetic medium is PET being 200 μm thick; and the magnetic material is coated with strontium ferrite powder having an average particle diameter 1 μm to 10 μm so as to be 30 μm thick. Then, a load that initiates deformation is 1136 mN (116 gf), and a load per unit area that causes deformation of the magnetic medium, beginning with the area in contact, is 757 mN/mm$^2$. When a pressing load 800 mN (82 fg) or smaller is applied in consideration of safety factor, a load of about 530 mN/mm$^2$ or smaller per unit area is resulted. With a load value per unit being 530 mN/mm$^2$ or smaller, as described above, deformation of the surface of the magnetic medium by the sensor substrate 10 having a magnetic sensor element mounted thereon can be prevented. Also, with a load value per unit being 530 mN/mm$^2$ or smaller, the width of the sensor substrate 10 in the slide direction needs to be 0.5 mm or larger. The sensor substrate 10 can be formed substantially rectangular.

The center of the sensor holding unit 31 constitutes a load point at which to apply a pressing load onto the magnetic medium. With a magneto resistive effect element (e.g., the GMR element 2a), or a magnetic sensor element, placed at the load point, it is possible to minimize a difference in an output of the magnetic sensor element that is caused depending on the moving direction when the sensor holding plate 30 reciprocates relative to the magnetic medium.

Figure 11:
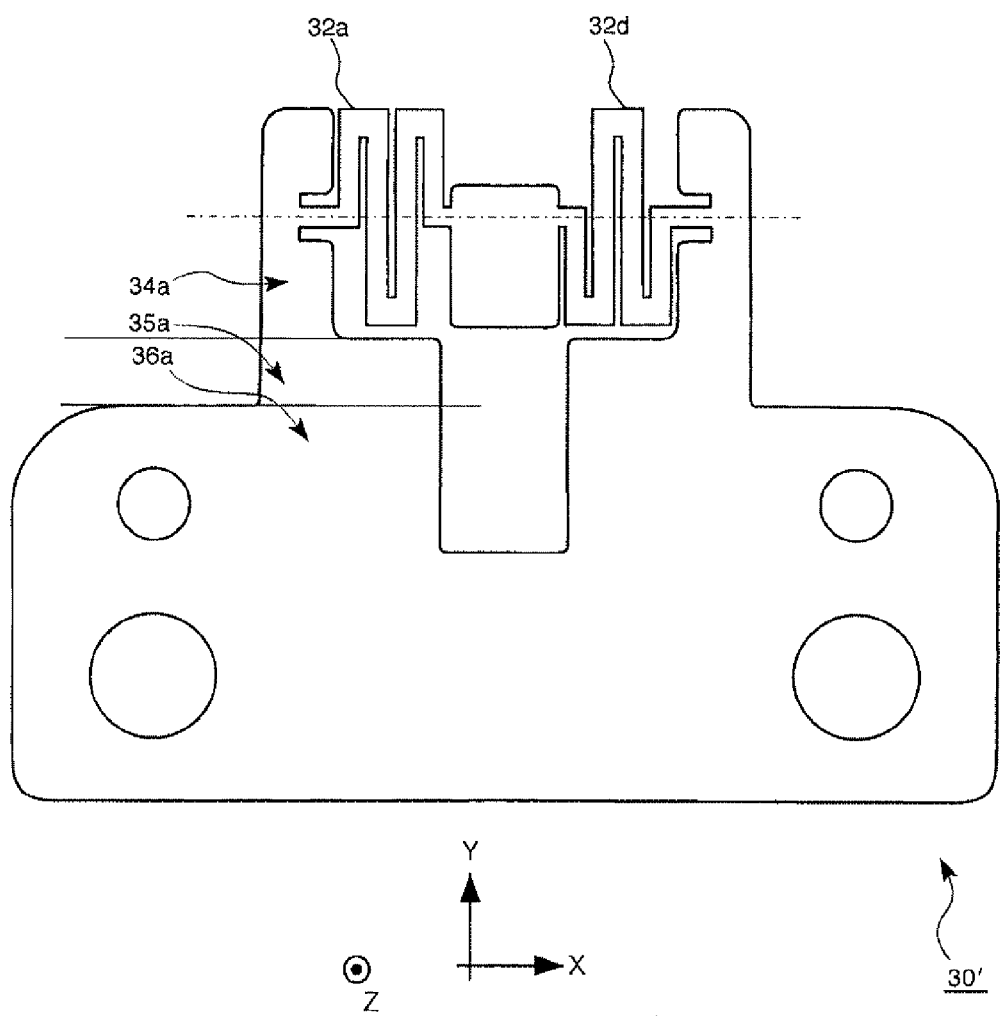
FIG. 11 is a plan view of a sensor holding plate according to one aspect of the embodiment of the present invention.

The sensor holding plate of the magnetic encoder in this embodiment is not limited to the example shown in FIG. 1. FIG. 11 is a front view of a sensor holding plate 30' according to another aspect of this embodiment. According to this aspect, the shape of the elastically deformable portion 32b of the sensor holding plate 30 shown in FIG. 1 is changed to form an elastically deformable portion 32d shown in FIG. 11, with the remaining parts being the same as those of the sensor holding plate 30 shown in FIG. 1.

That is, in the sensor holding plate 30 shown in FIG. the elastically deformable portions 32a, 32b on the both respective sides of the sensor holding portion 31 are symmetrical relative to the central axis in parallel to the Y axis of the sensor holding portion 31. Meanwhile, in the example shown in FIG. 11, the elastically deformable portions 32a, 32d have a relationship in which one of the elastically deformable portions 32a and 32d is vertically flipped relative to the rotation axis in parallel to the X axis. Specifically, the elastically deformable portion 32d has an upside-down shape of the elastically deformable portion 32b shown in FIG. 1 relative to the axis indicated by the one dot chain line in parallel to the X axis in FIG. 11.

Figure 12:
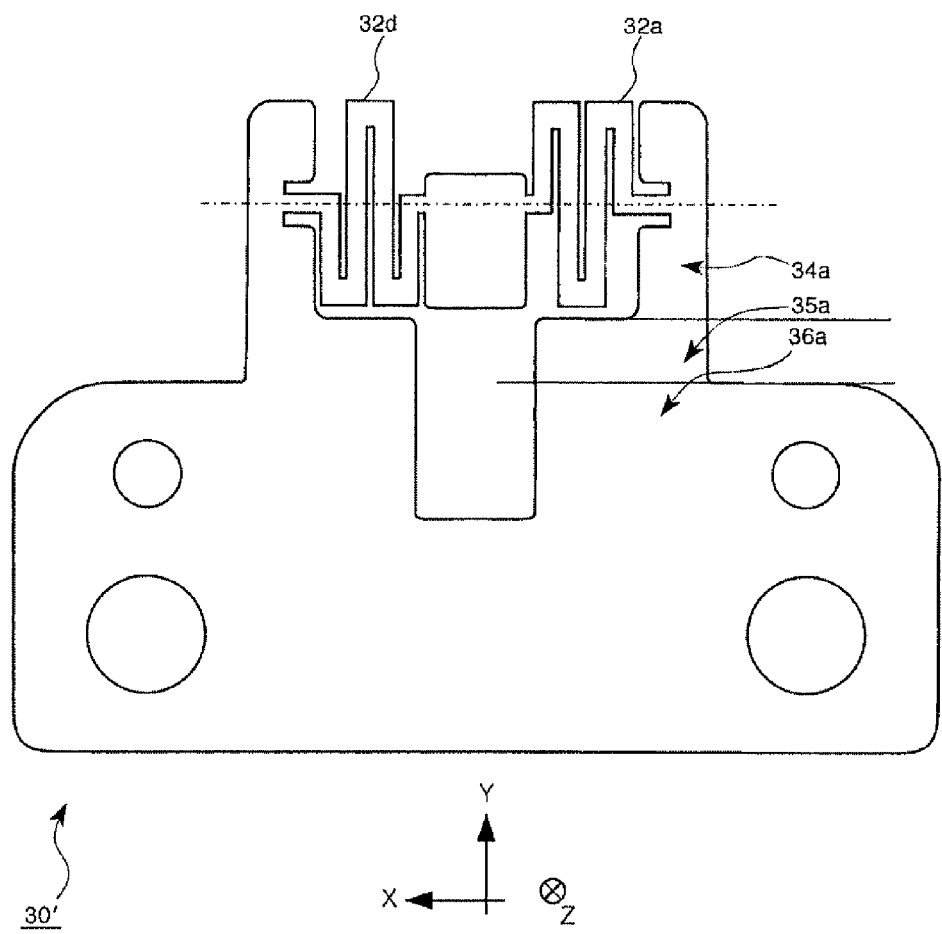
FIG. 12 is a bottom view of the sensor holding plate according to one aspect of the embodiment of the present invention.

In this example shown in FIG. 11, a line that connects the centers in the width direction of the respective roots (two points) of the elastically deformable portions 32a, 32d in the respective crossover sections 34a, 34d and those of the respective roots (two points) of the elastically deformable portions 32a, 32d on the side of the sensor holding portion 31 is indicated by the one dot chain line (in parallel to the X axis). As the elastically deformable portions 32a and 32d are centrosymmetric, the position of the pitch rotation central axis is getting closer to the line (one dot chain line) connecting the centers in the width direction of the respective roots (two points) of the elastically deformable portions 32a, 32d in the crossover sections 34a, 34b and those of the respective roots (two points) of the elastically deformable portions 32a, 32d on the side of the sensor holding portion 31. That is, in the example shown in FIG. 11, the pitch rotation central axis of the elastically deformable portion 32 is positioned substantially on the line (one dot chain line) connecting the centers in the width direction of the respective roots (two points) of the elastically deformable portions 32a, 32d in the crossover sections 34a, 34b and those of the respective roots (two points) of the elastically deformable portions 32a, 32d on the side of the sensor holding portion 31. As the position of the pitch rotation central axis is getting closer to the line connecting the centers as above described, twist of the elastically deformable portion tends to be less readily preventable. Note that FIG. 12 is a bottom view of the sensor holding plate 30' shown in FIG. 11. A cross section of the sensor holding plate 30' is not shown as being the same as the example shown in FIGS. 4 and 5.

Figure 13:
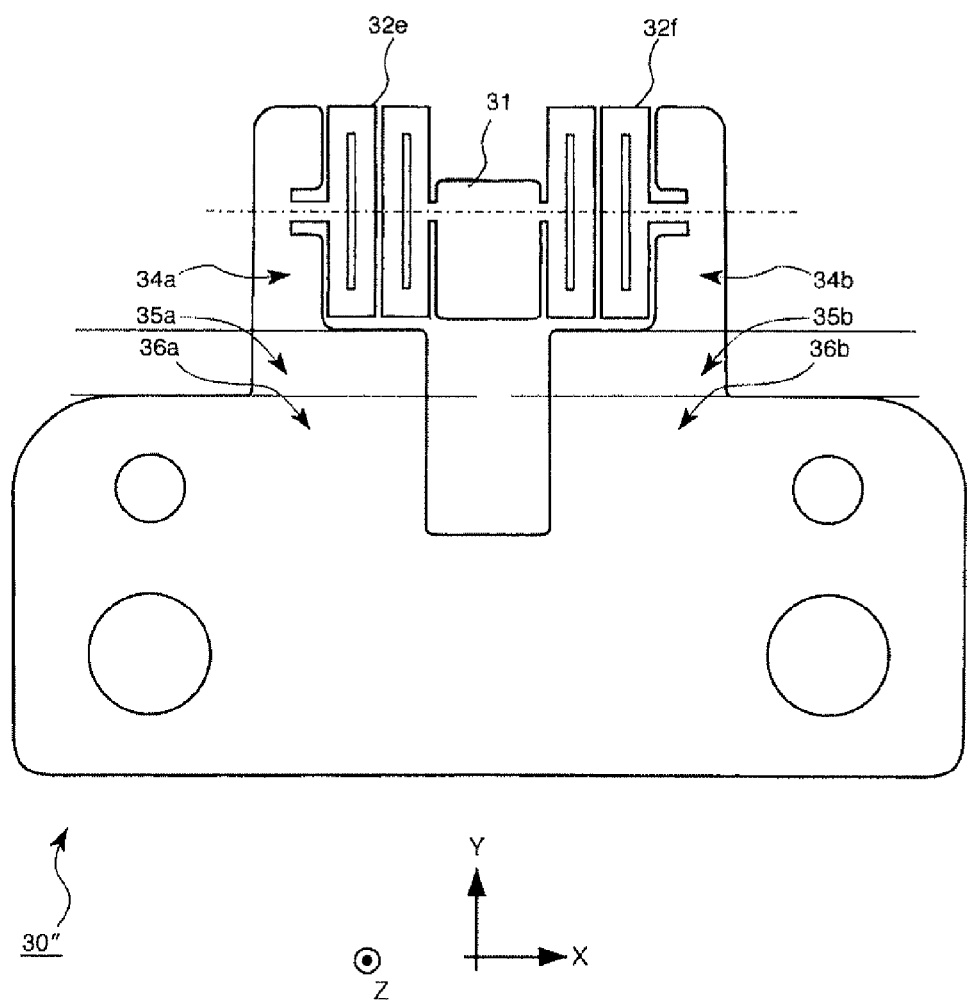
FIG. 13 is a plan view of the sensor holding plate according to one aspect of the embodiment of the present invention.

FIG. 13 is a plan view of a sensor holding plate according to a still another aspect of this embodiment. In the sensor holding plate 30" shown in FIG. 13, the pair of elastically deformable portions 32a, 32b shown in FIG. 1 is replaced by a pair of elastically deformable portions 32e, 32f having a different shape, with the remaining parts being the same as those of the sensor holding plate 30 shown in FIG. 1. The elastically deformable portions 32e, 32f each have a shape formed by connecting two O-rings each in a rectangular outer shape. Note that a rear view can be obtained by mirror reversing in the left-right direction relative to the Y axis.

The magnetic encoder in this embodiment has the sensor holding plate 30 formed as described above, and operates as described below. Below, an example will be described in which, in a focusing mechanism for focusing by rotating the lens of a camera, the rotation position of the lens is determined.

In this example, the magnetic sheet 60 as a magnetic medium is placed on a rotatable portion of the lens. Further, the fixing portion 37 of the sensor holding plate 30 is fixed to a portion of the lens that is not rotated, and the sensor substrate 10 mounted on the sensor holding plate 30 is placed for sliding on the magnetic sheet 60. In this manner, the magnetic sheet 60 is movable relative to the sensor holding plate 30. Further, the magnetic sheet 60 has magnetizing directions that are different for every predetermined interval in the relative movement direction with respect to the sensor holding plate 30.

The GMR element 2a determines the magnetizing direction in an area of the magnetic sheet 60 adjacent to the GMR element 2a, and outputs a result of determination in the form of an electric signal. When the camera lens is rotated and the magnetic sheet 60 is thus moved relative to the sensor holding plate 30, the magnetizing direction in the area of the magnetic sheet 60 adjacent to the GMR element 2a of the sensor holding plate 30 is changed, and an electric signal output from the GMR element 2a is accordingly changed. The magnetic encoder in this embodiment determines the rotation position of the lens, based on the change of the electric signal.

Figure 14:
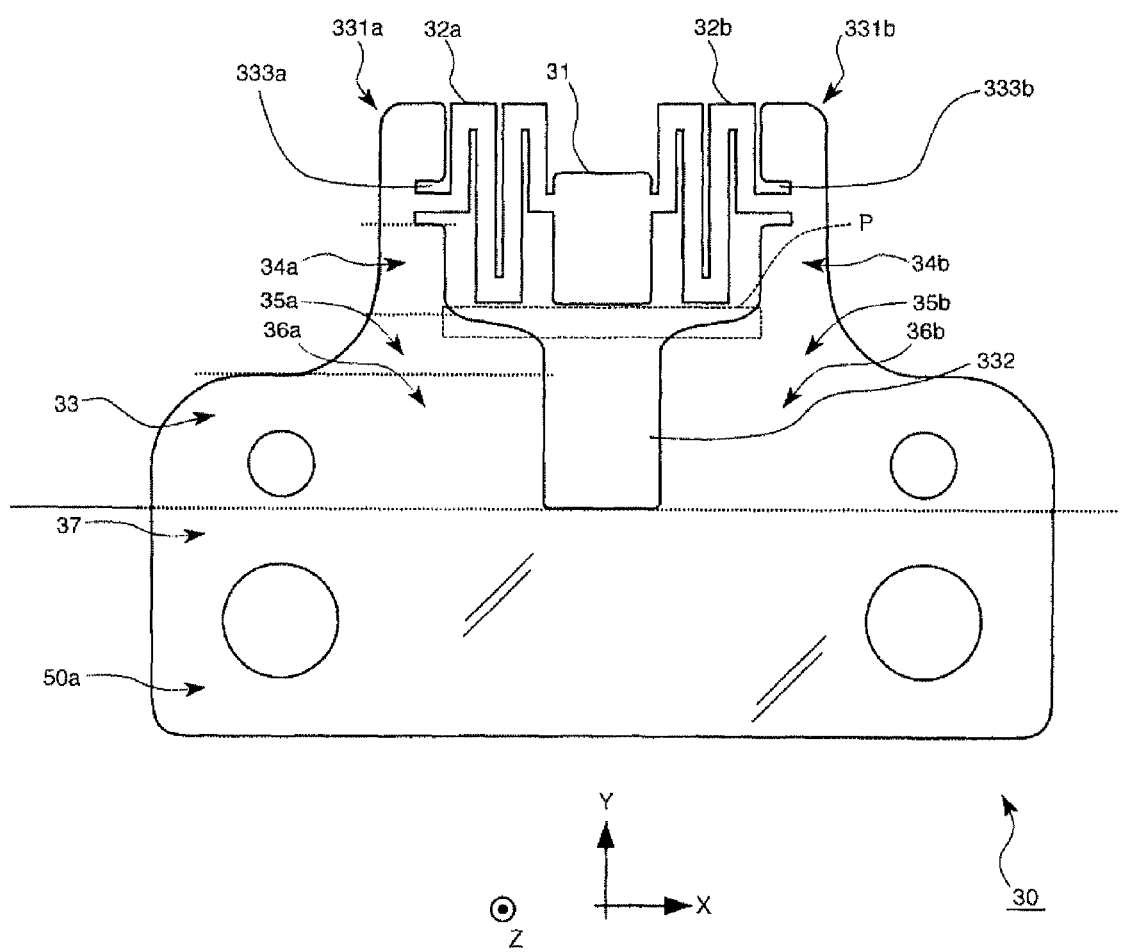
FIG. 14 is a plan view of a sensor holding plate according to another aspect of the embodiment of the present invention.

FIG. 14 is a plan view of an example of a sensor holding plate according to a yet another aspect of the embodiment of the present invention. According to the sensor holding plate shown in FIG. 14, the outside edge of the area between the crossover section 34 and the thick width portion 35 is defined such that the area becomes continuously wider. Further, the cut-out 332 is shaped so as to become wider as it goes toward the crossover section 34 (P), rather than substantially rectangular. In this embodiment, only either one of the widening by changing the outer edge and the widening of the cut-out may be applied.

EXAMPLE

In the following, an example is described in which the sensor holding plate 30 shown in FIG. 1 is formed by punching a thin panel of a non-magnetic stainless SUS 304 of 80 μm thick. The width of the linear portion of the bent elastically deformable portion 32 is basically 0.8 mm but partially changed to reduce stress concentration (such that the average of the widths (a value obtained by integrating the width over the entire length of the linear portion and then dividing the obtained value by the entire length value) becomes Wa). The sensor holding plate 30 has a vertical length 10 mm and a horizontal length 15 mm at the maximum. Two or more spin valve elements are bridge-connected to the GMR element $2a$, and the respective spin valve elements are placed in parallel to one another with the longitudinal direction thereof in parallel to the longitudinal direction (the Y axial direction) of the sensor substrate 30.

The sensor substrate 10 is made as follows. Initially, a spin valve-type magneto-resistive element and a wire are formed on a silicon wafer, using a photolitho technique, a vacuum coating technique, and an etching technique. Then, an oxide silicon film of about 2 μm thick is formed on the magneto-resistive element. The wafer having a magneto-resistive element or the like formed thereon as described above is cut using a diamond grinder into a piece having a width w 0.5 mm and a length 3.0 mm, whereby the sensor substrate 10 is obtained. As the thickness of the magneto-resistive element, the wire, and the oxide silicon film on the magneto-resistive element are each of a few orders of μm, the wafer thickness can be considered the same as the sensor substrate thickness h' including the magnetic sensor element. The film thickness of the oxide silicon film on the magneto-resistive element makes a magnetic gap between the magneto-resistive element and the surface of the magnetic sheet 60. In the magnetic encoder, the magneto-resistive element is placed at a position displaced in the positive direction of the Y axis from the edge $60a$ of the magnetic sheet on the side of the fixing portion 37. The sensor substrate 10 is fixed to the glass epoxy wire substrate 20 obtained, and the wires of the glass epoxy wire substrate 20 and of the sensor substrate 10 are made electrically conductive to each other.

The magnetic sheet 60 is formed by adhering a tape-like plastic film coated with magnetic material onto a non-magnetic surface having a predetermined curvature, using an adhesive. The width Wb of the magnetic sheet in the direction in which the magnetic sheet slides relative to the sensor substrate 10 as the non-magnetic surface moves or rotates is defined as 3 mm, and the curvature radius of the surface of the magnetic sheet is defined as 27.5 mm.

In FIG. 2, the sensor substrate 10 is pressed in the negative direction of the Z axis using a pin, instead of the magnetic sheet 60, at a point on the center line that connects the center in the width direction of the sensor holding portion 31 and that of the fixing portion 37 to see how the sensor substrate is inclined relative to the XY plane. When the sensor substrate is pressed using the pin and the surface of the sensor substrate is thus moved in the negative direction of the Z axis while remaining in parallel to the XY plane, a line that perpendicularly intersects the center line at the press point is defined as the "pitch rotation central axis". When a point displaced toward the fixing portion 37 from the pitch rotation central axis is pressed using a pin, the sensor substrate performs pitch rotation to thus be inclined relative to the XY plane. Meanwhile, when a point displaced toward the opposite side from the fixing portion 37 is pressed using a pin, the sensor substrate performs reverse pitch rotation to thus be inclined relative to the XY plane.

Figure 15:
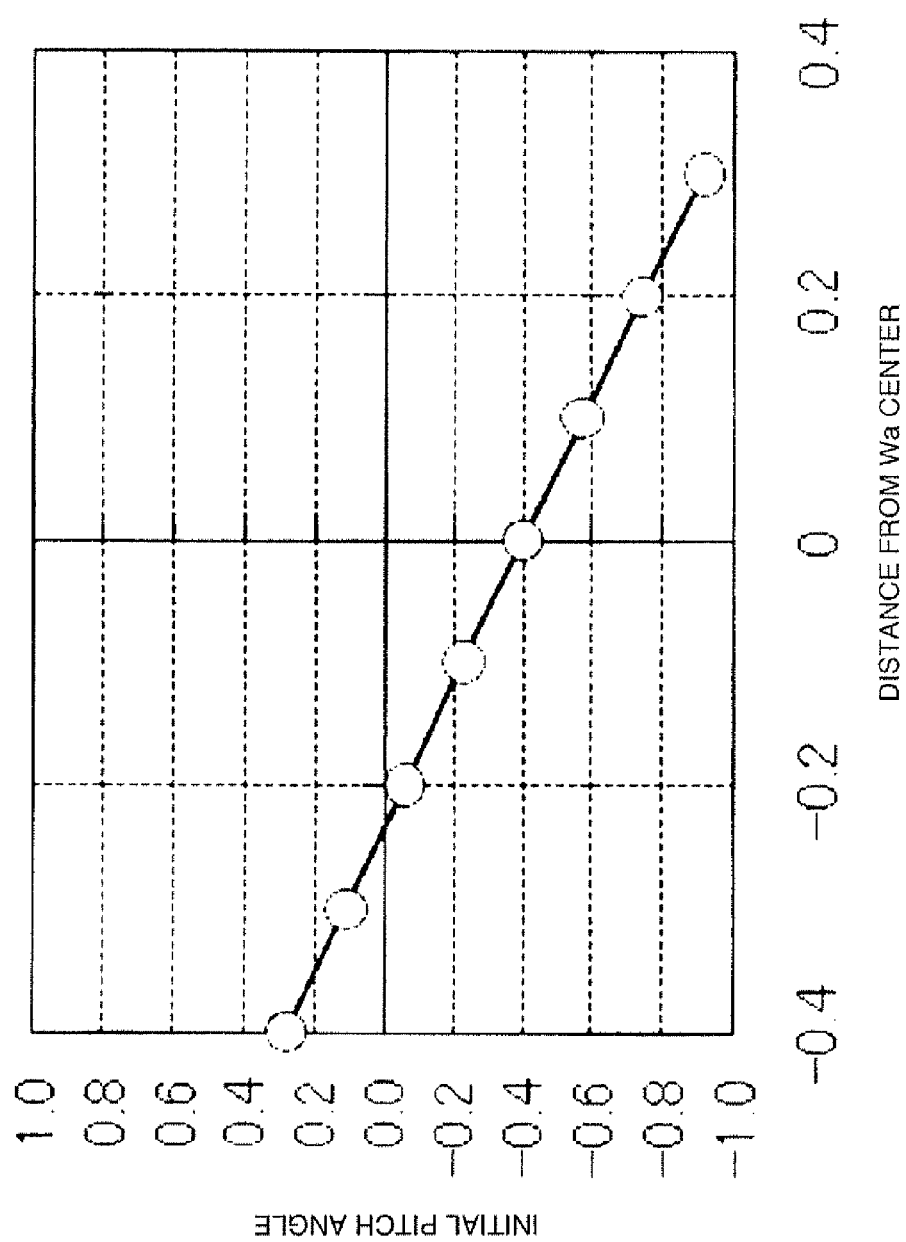
FIG. 15 explains an example relationship between a moving distance (mm) and a pitch angle (the initial pitch angle) (°)) when, in the magnetic encoder according to one embodiment of the present invention, a load point for pressing is moved in the Y direction from a position on a line passing through the center in the width direction of an end of the elastically deformable portion 32 on the side of the arm portion 331.

The graph in FIG. 15 shows a relationship between a pitch angle (the initial pitch angle) (°)) and the distance (mm) from the Wa central axis when a load point for pressing is moved in the Y axial direction from a point on the line passing through the centers in the width direction of the ends of the elastically deformable portions 31 on the side of the arm portions 331 (referred to as the Wa central axis). A load of 1 gf is applied to the load point. As to the values imparted to the abscissa, a positive value indicates a load point having moved toward the fixing portion 37, and a negative value indicates a load point having moved to the other side.

Figure 16:
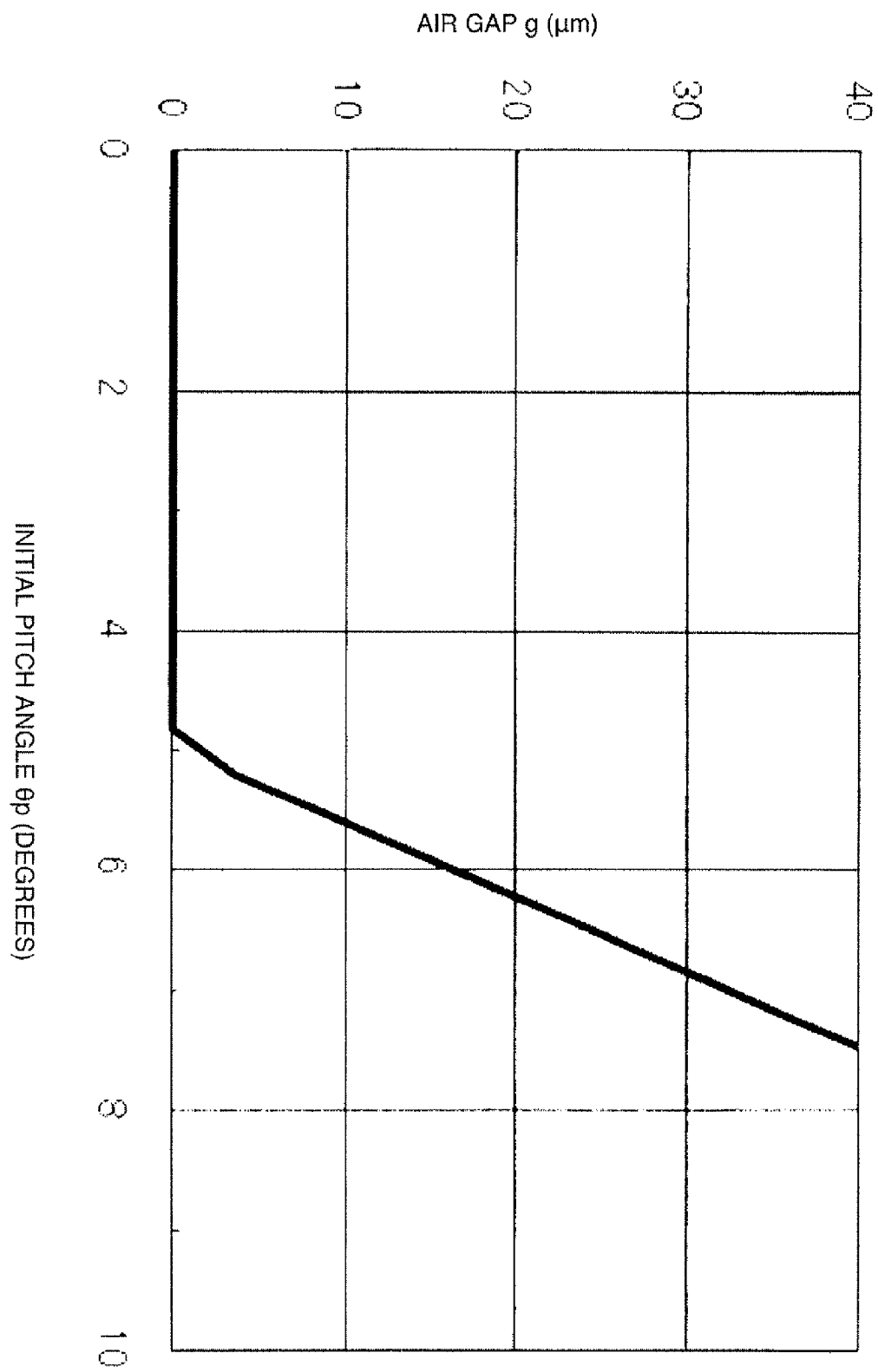
FIG. 16 explains an example relationship between a pitch angle and an air gap in the magnetic encoder according to one embodiment of the present invention.
Figure 17:
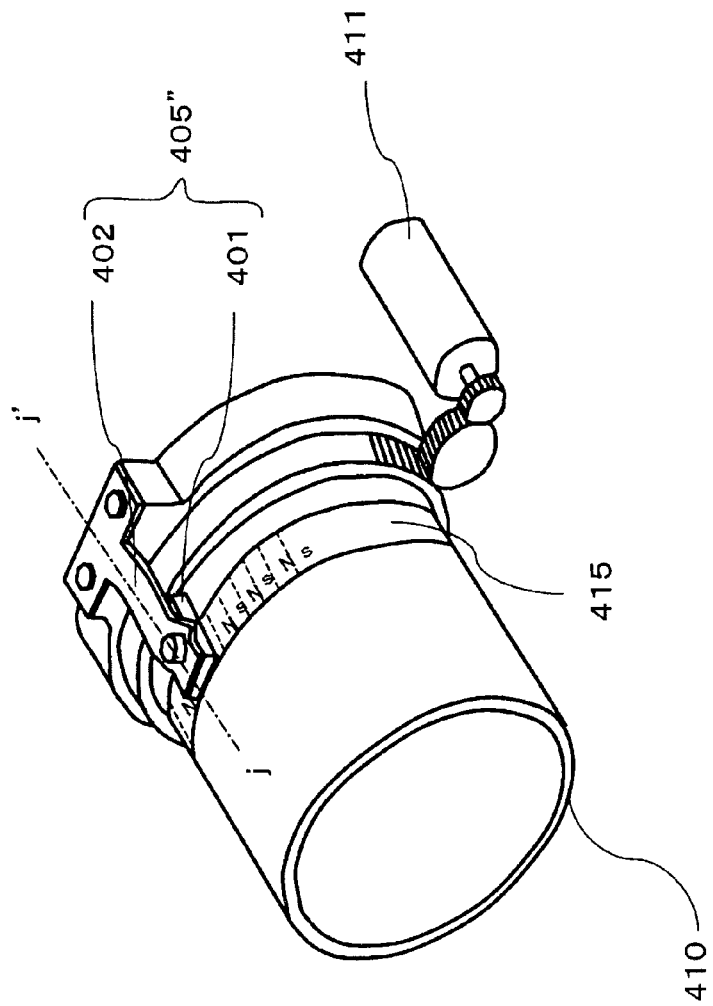
FIG. 17 is a perspective view of a lens barrel of a conventional autofocus camera.
Figure 18:
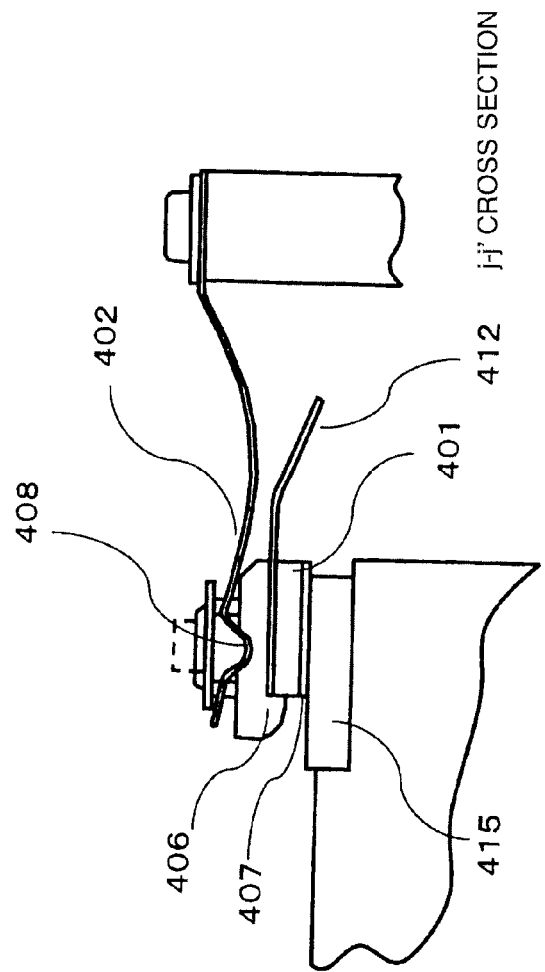
FIG. 18 schematically shows a magnetic sensor used in a lens barrel of a conventional autofocus camera.
Figure 19:
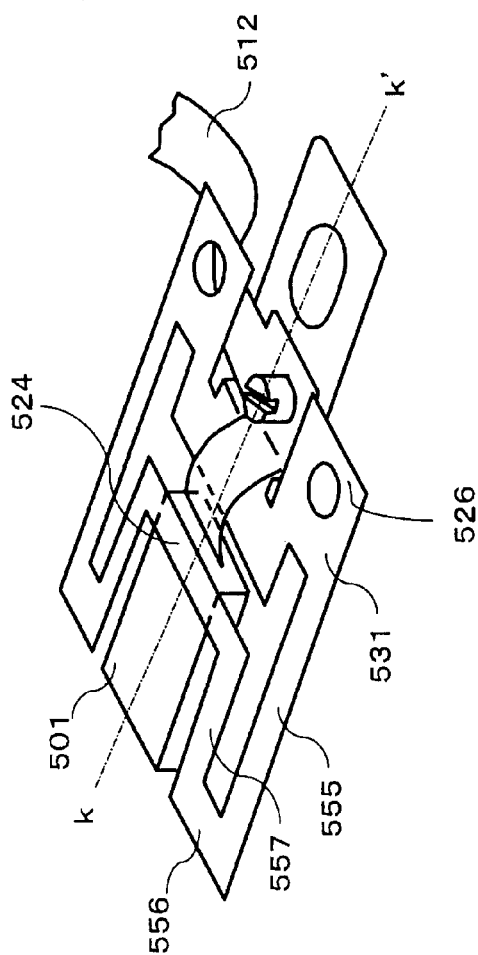
FIG. 19 is a perspective view of a conventional magnetic sensor for reducing pitch angle variation.
Figure 20:
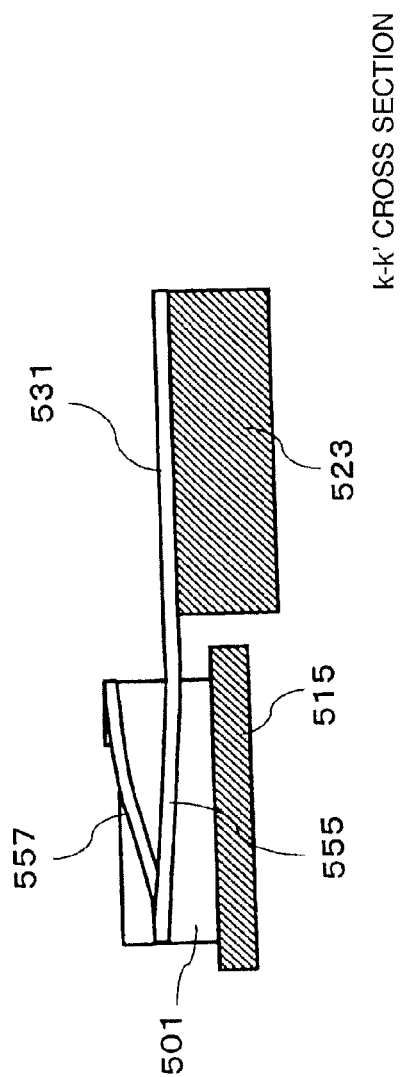
FIG. 20 is a cross sectional view of a conventional magnetic sensor for reducing pitch angle variation.
Figure 21:
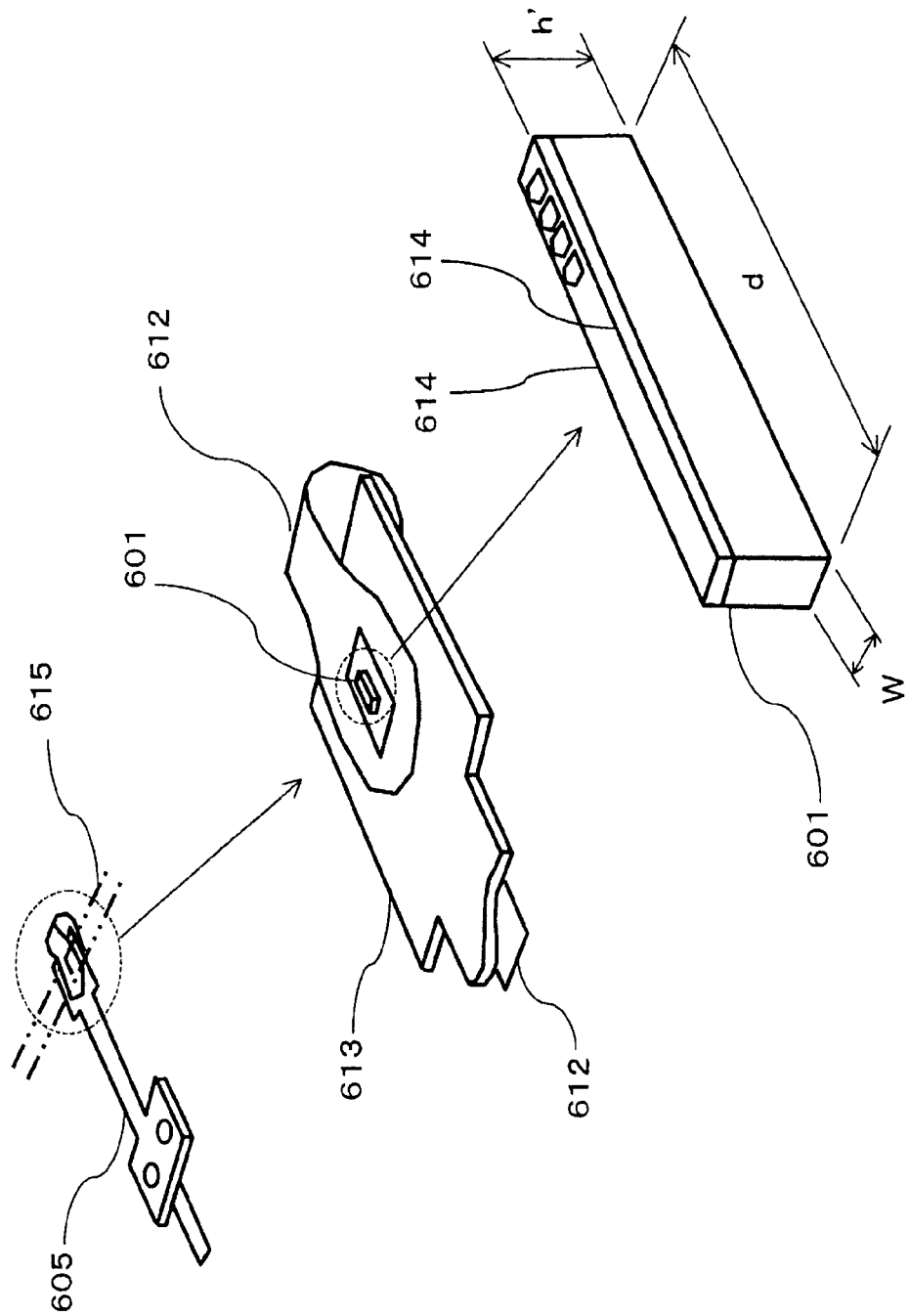
FIG. 21 schematically shows a conventional magnetic sensor for reducing a displacement in a slide direction.
Figure 22:
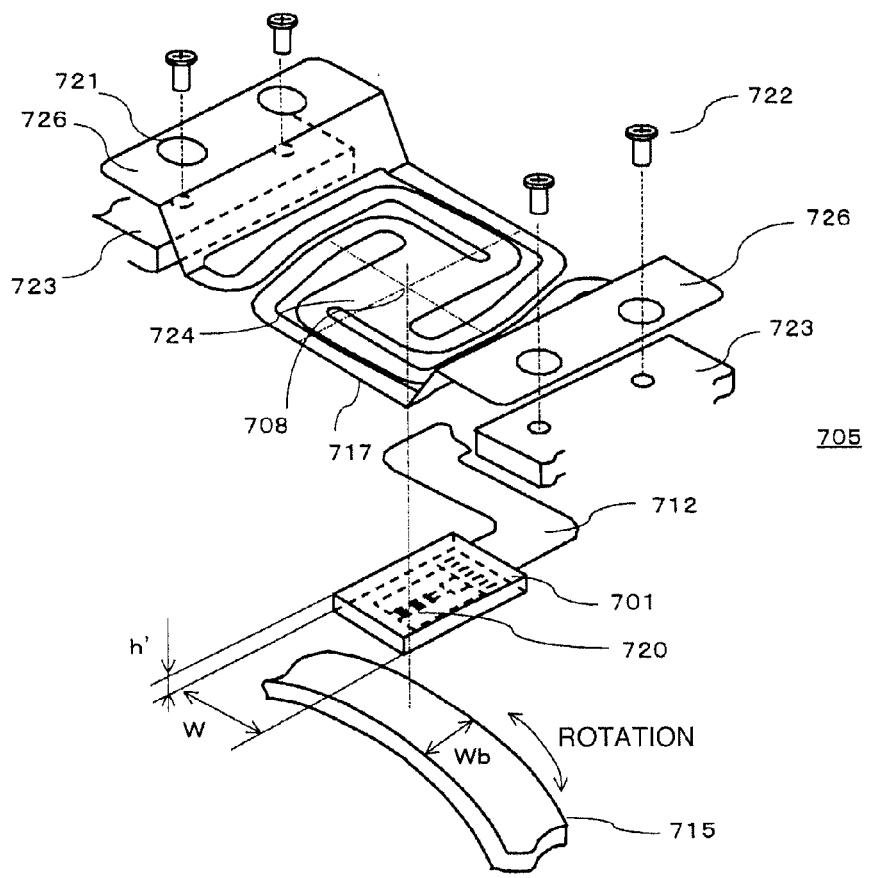
FIG. 22 is an exploded perspective view of a conventional magnetic sensor.

As to the sensor holding plate 30, kp=0.5 (gf·mm/°) and L1=1.37 mm are defined. FIG. 16 shows a relationship between a pitch angle and an air gap with the load F=2.12 gf held with the magnetic encoder. With a small pitch angle, increase of the air gap can be prevented, and the sensor substrate can be slid relative to the magnetic sheet.

INDUSTRIAL APPLICABILITY

The present invention can be implemented as a magnetic encoder for detecting a magnetic field emanating from a magnetic medium, using a magnetic sensor, to obtain a displacement or a speed of a movable member.

DESCRIPTION OF REFERENCE NUMERALS $2a$: GMR element
10: sensor substrate
20: wire substrate
30: sensor holding plate
30': sensor holding plate
30": sensor holding plate
31: sensor holding portion
$32a$, $32b$: elastically deformable portion
$32e$, $32f$: elastically deformable portion
$32d$: elastically deformable portion
$33a$, $33b$: support portion
$34a$, $34b$: crossover section
$35a$, $35b$: thick width portion
$36a$, $36b$: wide width portion
37: fixing portion
38: hole
$39a$, $39b$: hole
40: FPC
51: resin
$50a$: $50b$: mount pedestal
60: magnetic sheet
$60a$: edge of magnetic sheet
331: arm portion
332: cut-out
333: slit

The invention claimed is:
1. A magnetic encoder, comprising:
a magnetic medium placed on a first member and a magnetic sensor placed on a second member, the first member and the second member for moving relative to each other,
wherein
the magnetic sensor includes
a sensor substrate having a magneto-resistive element mounted thereon for detecting a magnetic field emanating from the magnetic medium, for reciprocatively sliding relative to the magnetic medium;

a sensor holding plate for holding the sensor substrate; and a wire for extracting a signal from the magneto-resistive element to outside, the sensor holding plate includes a fixing portion for fixing the sensor holding plate to the second member;

a sensor holding member for holding the sensor substrate; and a plurality of arm portions provided in the direction of relative movement, with the sensor holding member in-between, and extending from the fixing portion so as to each constitute a cantilever, and the arm portion has a portion of which width becomes larger either continuously or stepwisely from a side of the sensor holding member toward the fixing portion, and the arm portion has a slit arranged in a horizontal direction and a connecting portion that extends from the slit portion connecting the arm portion to the sensor holding plate.

2. The magnetic encoder according to claim 1, wherein the sensor holding member has a plurality of elastically deformable portions provided corresponding to the plurality of arm portions and each placed between each arm portion and a member for holding the sensor substrate.

3. The magnetic encoder according to claim 2, wherein in the arm portions, a maximum width M2 in a crossover section for intersecting the magnetic medium, a length L4 from a rotation central axis in a pitch direction of the elastically deformable portion to the fixing portion, a sum Lall of lengths of the elastically deformable portions, and a width Wa of the elastically deformable portions satisfy (M2/L4)>(Wa/Lall).

4. The magnetic encoder according to claim 2, wherein a distance L1 between an end of the magnetic medium on a side of the fixing portion and a rotation central axis in a pitch direction of the elastically deformable portion satisfies Wb/3<=L1<=2Wb/3, using a width Wb of the magnetic medium.

* * * * *